United States Patent [19]

Saleeb et al.

[11] Patent Number: 4,664,920
[45] Date of Patent: May 12, 1987

[54] METHOD FOR FIXING FOOD INGREDIENTS ON A MAGNESIUM SALT SUBSTRATE

[75] Inventors: Fouad Z. Saleeb, Pleasantville, N.Y.; Randal P. McKay, Paramus, N.J.

[73] Assignee: General Foods Corporation, White Plains, N.Y.

[21] Appl. No.: 757,048

[22] Filed: Jul. 19, 1985

Related U.S. Application Data

[63] Continuation-in-part of Ser. No. 621,008, Jun. 15, 1984, abandoned.

[51] Int. Cl.$^4$ ................................................ A23L 1/30
[52] U.S. Cl. .......................................... 426/74; 426/96; 426/250; 426/540; 426/599; 426/650; 426/651; 426/471; 426/658; 426/444
[58] Field of Search ............... 426/74, 96, 98, 589, 426/590, 599, 650, 651, 250, 540, 455

[56] References Cited

U.S. PATENT DOCUMENTS

| | | | |
|---|---|---|---|
| 3,370,956 | 2/1968 | Rietman et al. | 426/96 |
| 3,886,300 | 5/1975 | Fuji | 426/582 |
| 4,004,039 | 1/1977 | Shoaf | 426/96 X |
| 4,059,706 | 11/1977 | Pischke et al. | 426/96 X |

OTHER PUBLICATIONS

Hawley, The Condensed Chemical Dictionery, 10th Ed., 1981, Van Nostrand & Rienhold, NY, pp. 632–637.

*Primary Examiner*—Jeanette Hunter
*Attorney, Agent, or Firm*—Barbara Toop D'Avanzo; Thomas R. Savoie; Daniel J. Donovan

[57] ABSTRACT

A method for fixing a water-soluble water-dispersible or water-emulsifiable food ingredient is disclosed. The food ingredient is dried from an aqueous solution of a monobasic, dibasic and/or tribasic magnesium salt, the salt constituting the fixing substrate. The fixation of juice solids, flavors, colors and high fructose corn syrups are enabled by this method.

12 Claims, No Drawings

METHOD FOR FIXING FOOD INGREDIENTS ON A MAGNESIUM SALT SUBSTRATE

This is a continuation-in-part of application Ser. No. 621,008, filed June 15, 1984 now abandoned.

The present invention relates to a method for fixing various food ingredients, including colors, flavors, juice solids, vegetable solids, spices and hygroscopic sugars; and more specifically to fixing said ingredients on a magnesium salt substrate. According to the present invention, "fixing" or fixation refers to the entrapment and/or encapsulation of the food ingredient in such a manner that the food ingredients which are non-volatile but are subject to oxidation and/or moisture pickup, are protected against ambient atmospheric conditions, and volatile ingredients and volatile portions of ingredients are retained within the substrate.

There are numerous methods in existence to fix food ingredients in edible substrates. Examples of materials commonly used as substrates are dextrins and hydrophilic colloids (e.g. gum arabic, gelatin, etc.). Use of these materials presented certain recognized obstacles to food fixation, particularly loss of flavor components resulting in a lowered "fix", and increase in caloric intake from use of high levels of high calorie substrates.

PRIOR ART

The prior art contains many examples of fixing food ingredients in substrates, and of producing dry juice solids.

U.S. Pat. No. 3,554,768 to Feldman discloses forming a solution of a carbohydrate and the volatile flavorant acetaldehyde and then drying this solution such as by spray-drying.

U.S. Pat. No. 3,061,444 to Rogers et al. discloses the fixation of all or a portion of a natural juice in a combination of water-soluble cyclic and acyclic dextrins by forming a solution of these materials and then drying the solution.

U.S. Pat. No. 2,567,038, issued to Stevens et al. discloses a method for drying fruit juices that includes the following steps: buffering or partly neutralizing the pH of a juice with calcium carbonate or sodium citrate; pasteurizing the buffered juice; concentrating the juice to about 75% to 90% solids; improving the stability of the juice by adding ascorbic acid; adding the concentrated juice to granular sugar and drying the product by a vacuum dryer or by means of an air dryer.

U.S. Pat. No. 4,112,130, issued to Gupta reveals a method for spray-drying a citrus juice comprising (a) providing an aqueous slurry including up to about 65% solids, about 50-85% of the solids being orange juice solids with the balance consisting essentially of maltodextrin and (b) concurrently spray-drying said slurry to a powder having an average moisture content of less than about 4% in a spray-drying apparatus.

U.S. Pat. No. 4,059,706 to Pischke et al. discloses the encapsulation of undissolved L-aspartic acid sweetening compound in a water-soluble encapsulating agent forming a dispersion of a water-soluble encapsulating agent and undissolved L-aspartic acid sweetening compound, and then drying this dispersion such as by spray-drying.

DESCRIPTION OF THE INVENTION

The present invention is directed to a process for fixing various food ingredients such as colors, flavors, vegetable juice solids, fruit juice solids, spices, hygroscopic carbohydrates (e.g., sugars, high D.E. dextrins, etc.), components thereof, and the like, to the products produced from this fixation process and to food compositions containing the fixed food ingredients of this invention. The present invention will have utility to fix any food ingredient which is either water-soluble, waterdispersible or water-emulsifiable. According to this invention, these materials are fixed in a substrate which is comprised of and preferably consists essentially of the magnesium salts of edible monobasic, dibasic and/or tribasic acids. Suitable monobasic acids are acetic acid, propionic acid and lactric acid. Suitable dibasic acids are adipic acid, fumaric acid, malic acid, succinic acid and tartaric acid. Suitable tribasic acids are phosphoric acid and citric acid.

The magnesium salts display certain properties which make them suitable as a fixation substrate, as opposed to other salts. The use of sodium, potassium or calcium salts of organic or inorganic acids have not been found to be suitable. The magnesium salts of the above-stated acids are more water-soluble than the corresponding calcium salts, and simultaneously are not hygroscopic as are the sodium and potassium salts of these acids.

In particular, an unexpected property is that the magnesium salts of adipic and fumaric acids are much more soluble in cold or warm water than the pure acids themselves. This property is most evident with fumaric acid, which is the least soluble of these acids. Thus, magnesium salts appear to be unique among the metal salts as fixatives.

The fixation process is accomplished by mixing an aqueous solution of the magnesium salt and the ingredient(s) to be fixed, and then drying the mixture. The magnesium salt in the solution can result from the direct addition of a magnesium salt, or can be formed in situ by the addition of a basic magnesium compound (e.g. $Mg(OH)_2$ $MgO$, $MgCO_3$, etc.) to an acid-containing solution such as a fruit juice, or by a combination of these two methods. The sequence in which the various materials are added to form a mixture of the magnesium salt solution and the food ingredient or ingredients to be fixed is not critical to this invention. The prime requisite is that immediately before drying the aqueous liquid contain magnesium cation, acid anion and the ingredient which is sought to be fixed.

After an aqueous solution of a magnesium salt and the ingredient sought to be fixed is formed, the mixture must be dried. The mixture may be dried by any conventional drying technique such as freeze-drying, spray-drying or drum drying. In order to maximize efficiency of the fixation, in particular when those ingredients to be fixed contain or consist essentially of volatiles, the temperature during drying should be kept as low as possible. Spray-drying and freeze-drying are preferred to drum drying. In spray-drying the inlet air temperature is in the range of 100° C. to 250° C., preferably 150° C. to 180° C., and the outlet air temperature is within the range of 50° C. to 100° C., preferably 80° C. to 90° C.

The amount of food ingredients which may be fixed according to the process of this invention can be up to 9 parts by weight for each part by weight of added magnesium salt.

The amount of magnesium present should be such that, for each mole of acid contained in the solution, there should be from at least 0.3 moles of magnesium present in solution. It is speculated that the dried magnesium salt is the material which forms the fixation substrate, in which event from about 0.4 to 1.5 moles, typically about 0.5 to 0.8 moles of magnesium will be present in the solution for each mole of acid present in the solution. The level of magnesium in the dry magnesium salt substrate will be from about 4 to 30% by weight.

This invention is highly suited for the fixation of natural juice constituents. These constituents may comprise all or part of a particular juice and may be of varying molecular structures. Because of the relatively high fix levels which can be obtained and the inherent low-calorie, non-carbohydrate nature of the magnesium salt substrate, the fixed food ingredients of this invention are ideally suited for use in or as low-calorie food products. Unlike prior art processes which rely on added carbohydrates for fixation, this process is accomplished without the addition of caloric carbohydrates.

This invention has been established to provide fixation for edible solids, for volatile flavors and flavor enhancers such as those compounds naturally found in fruits, spices and vegetables, for colorants such as the color-imparting agents or compounds naturally found in juices or extracts and for hygroscopic carbohydrate solids such as those contained in high fructose corn syrups. As will be recognized by those skilled in the art, the fixation of complex mixtures such as natural juice solids will inherently include the fixation of flavors, colors, proteins and carbohydrates at one time.

The process provides for the fixation of those ingredients which have high levels of solubility and/or those, such as sugars, which are known to be difficult to dry. This process also provides the definite and distinct barriers needed to retain volatile portions of ingredients within the substrate while also providing protection against ambient atmospheric conditions to the non-volatile portions of ingredients.

The particular edible juices or extracts which may be fixed in accordance with this invention include those of leaves, vegetables, roots, spices, fruits, meat and the like.

The following examples are provided for illustration purposes and should not be construed as limiting the scope of the invention.

EXAMPLE 1

A magnesium citrate solution was prepared by combining 12.2 pounds (5.53 kgs) of citric acid monohydrate (obtained from Pfizer, Inc., New York, New York) and 7.6 pounds (3.45 kgs) of magnesium hydroxide (U.S.P. obtained from Mallinckrodt, Inc., Paris, Kentucky) and 96.1 pounds (43.59 kgs) of water at ambient temperature. To this solution was added 146 pounds (66.22 kgs) of 58.2° Brix orange juice concentrate (obtained from Sunkist Growers, Ontario, California). Orange juice typically has a citric acid content of from 5 to 20%, solids basis. The mixture was then spray-dried using a cocurrent stream of air having an inlet temperature of 380° F. (193.3° C.) and an outlet temperature of 210° F. (98.9C) resulting in a dry free-flowing yellow powder containing about 15% (by weight) added magnesium citrate carrier and about 85% juice solids. The dry powder was readily soluble in cold water at least up to a 10% level providing all the flavor characteristics of orange juice. The powder was also useful as an ingredient in an orange-flavored powdered soft drink mix at a level of from 1% to 60% by weight of the mix as a source of natural orange flavor, color and solids.

EXAMPLE 2

An aqueous magnesium hydroxide suspension was formed by combining 13.16 pounds (5.97 kgs) of magnesium hydroxide in 76 pounds (34.47 kgs) of water at ambient temperature. To this suspension was added 193.75 pounds (87.88 kgs) of 51.6° Brix lemon juice concentrate (obtained from Sunkist Growers). This lemon juice had a citric acid content of about 60% by weight, solids basis. The solution was dried as in Example 1 producing a dry, free-flowing, bone-white powder containing about 95% juice solids and about 5% magnesium. The solution contained about 0.7 moles of magnesium for each mole of acid and the level of magnesium found in the magnesium salt substrate was about 8.5% by weight. The dry powder was readily soluble in cold water at least up to a 10% level providing all the flavor characteristics of lemon juice. The powder was useful as an ingredient in a lemon-flavored powdered soft drink mix at a level of from 1 to 70% as a source of natural lemon flavor, color and solids.

EXAMPLE 3

An aqueous magnesium citrate solution was prepared by combining 90 grams of magnesium citrate ($Mg_3(C_6H_5O_7)_2 \cdot 2H_2O$) obtained from B.D.H. Chemicals Ltd., Poole, England) and 900 grams of water. To this solution was added 840 grams of 25° Brix tomato paste (obtained from Hunt-Wesson Foods, Inc., Fullerton, California). The mixture was blended to uniformity and then spray-dried using a cross-flow stream of air having an inlet temperature of 150° C. and an outlet temperature of 90° C. A dry, free-flowing, orange-red tomato powder was obtained having the natural color and flavor characteristics of tomato. The dry powder was readily soluble in water at least up to a 5% level. The dry powder was comprised of 70% tomato-solids and 30% magnesium citrate carrier. This powder is a suitable ingredient for use in a dry salad dressing mix at levels of from 5 to 25% by weight.

EXAMPLE 4

An aqueous magnesium fumarate solution was formed by combining 116 grams of fumaric acid and 42 grams of magnesium hydroxide (U.S.P. Mallinckrodt, Inc., Paris, KY) in 520 grams of water. To this solution was added 163 grams of high fructose corn syrup (Isosweet 180, 80% solids, Staley Manufacturing Co., Decatur, IL). The mixture was blended in a Niro spray dryer which maintained an inlet temperature of 150° C. (302° F.) and an outlet temperature of 90° C. (194° F.). A dry free-flowing product was obtained which was readily soluble in cold water. The dry powder was comprised of 50% corn syrup solids and 50% magnesium fumarate carrier.

EXAMPLE 5

An aqueous magnesium citrate solution was prepared by combining 90 grams of magnesium citrate ($Mg_3(C_6H_5O_7)_2 \cdot 2H_2O$, B.D.H. Chemicals Ltd., Poole, England) and 600 grams of water. To this, 415 grams of orange juice concentrate (65° Brix, Caulken, FL) was added. 10.8 grams of orange oil (terpenless #2395, Citrus and Allied Essence Ltd., Floral Park, NY) were then added, and the mixture was mixed for 2 minutes in a Waring blender. The mixture was then atomized and dried in a Niro spray dryer which maintained an inlet temperature of 135° C. and an outlet temperature of 90°

C. A dry, free-flowing highly aromatized powder was obtained. Gas chromatography revealed that the orange juice solids in the powder contained 3.9% orange oil. The amount of oil added to the solids was 3.0%, with 1.2% orange oil being naturally present in orange juice solids; thus, the total amount of oil present prior to drying was 4.2%. After exposure to ambient air for a period of three days, the amount of orange oil had decreased from 3.9% to 3.2%.

EXAMPLE 6

An aqueous magnesium citrate solution was prepared by adding 100 grams of magnesium citrate ($Mg(C_6H_6O_7)_2.2H_2O$) to 500 milliliters of water. To this, 3.0 milliliters of Wild Cherry flavor (Flavor Key, Pine Brook, NY) were added. The mixture was blended at high speed for 2 minutes in a flavor blender. The mixture was then transferred to a freeze drying pan and then fast frozen with liquid oxygen. The frozen slab had a nominal bed depth of ¼". The freeze drying pan containing the frozen slab was then transferred to the freeze dryer (Hull Co., PA, Model 10 F12). Once inside the dryer, the pan was placed on a shelf which had already been chilled to −35° C. The Chamber was evacuated to 200 microns. The shelf temperature was gradually increased from −35° C. to 30° C., over a period of 24 hours, during which time the vacuum did not exceed 500 microns. At the end of the 24 hour period, the vacuum was broken with high purity $N_2$ gas. The freeze dried products were non-hygroscopic free-flowing powder. The product contained 2.2% Wild Cherry flavor upon drying, and after setting out in ambient air for three days, was found to contain 1.7% Wild Cherry flavor.

EXAMPLE 7

An aqueous solution of calcium citrate was prepared by combining 56.1 grams of calcium oxide with 210 grams of citric acid monohydrate in 532 grams of water. The mixture immediately gelled and later solidified rendering it impossible to add the acetaldehyde/diacetyl flavorant, or to spray dry the mixture.

EXAMPLE 8

An aqueous calcium citrate mixture was prepared by adding 28 grams of calcium oxide to 210 grams of citric acid monohydrate in 476 grams of distilled water. To this, 11.0 grams of acetaldehyde/diacetyl flavorant was added. Some of the mixture precipitated out of solution. The mixture was then blended at high speed in a Waring blender for approximately two minutes, and then transferred to a Niro dryer. The dryer was maintained with an inlet temperature of 120° C. and an outlet temperature of 90° C. Gas chromographic analysis of the resultant powder indicates that there was no fixation or retention of the acetaldehyde/diacetyl flavorant after spray-drying.

EXAMPLE 9

An aqueous sodium citrate solution was prepared by adding 40.4 grams of sodium hydroxide pellets (99% pure) to 210 grams of citric acid monohydrate in 450 grams of distilled water. To this, 8.8 grams of acetaldehyde/diacetyl flavorant was added. The mixture was mixed in a high speed blender for less than 5 minutes, and was then transferred to a Niro dryer. The dryer maintained an inlet air temperature of 120° C., and an outlet air temperature of 90° C. The mixture did not dry, but remained coated on the walls of the dryer.

EXAMPLE 10

An aqueous solution of potassium citrate was prepared by adding 132 grams of potassium hydroxide (KOH, 85% pure) and 210 grams of citric acid monohydrate to 695 grams of distilled water. To this, 15.2 grams of acetaldehyde/diacetyl flavorant was added. After mixing, the mixture was transferred to a Niro spray dryer, which maintained an inlet air temperature of 120° C. and an outlet air temperature of 90° C. The resultant free-flowing powder was hygroscopic and collapsed in storage over night.

We claim:
1. A method of fixing food ingredients comprising the steps of:
    (a) forming an aqueous solution comprised of the magnesium salts of edible monobasic, dibasic and tribasic acids and combinations thereof and at least one water-soluble, waterdispersible or water-emulsifiable food ingredient; and
    (b) drying said solution to produce a dry fixed food ingredient.
2. The method of claim 1 wherein the drying is effected by freeze-drying, spray-drying or drum drying.
3. The method of claim 1 wherein the dry fixed food ingredient contains at least 10% by weight of magnesium salt.
4. The method of claim 1 wherein the mole ratio of magnesium to acid in the solution of step (a) is at least 0.3.
5. The method of claim 4 wherein the mole ratio is from 0.4 to 1.5:1.
6. The method of claim 1 wherein the magnesium comprises from 4 to 30% of the magnesium salt.
7. The method of claim 1 wherein the food ingredient comprises a volatile flavor or volatile flavor enhancer.
8. The method of claim 1 wherein the food ingredient comprises a colorant.
9. The method of claim 1 wherein the food ingredient comprises fruit or vegetable juice solids.
10. The method of claim 1 wherein the food ingredient comprises hygroscopic carbohydrates.
11. A fixed food ingredient produced by the method of claim 1.
12. A dry foodstuff containing the fixed food ingredient of claim 11.

* * * * *